United States Patent
Sridharan

(10) Patent No.: US 8,655,841 B1
(45) Date of Patent: Feb. 18, 2014

(54) SELECTION OF ONE OF SEVERAL AVAILABLE INCREMENTAL MODIFICATION DETECTION TECHNIQUES FOR USE IN INCREMENTAL BACKUPS

(75) Inventor: Srineet Sridharan, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/983,236

(22) Filed: Dec. 31, 2010

(51) Int. Cl.
*G06F 7/00* (2006.01)
*G06F 17/00* (2006.01)

(52) U.S. Cl.
USPC ............ 707/625; 707/624; 707/609; 707/646

(58) Field of Classification Search
None
See application file for complete search history.

(56) References Cited

U.S. PATENT DOCUMENTS 7,103,740 B1 * 9/2006 Colgrove et al. ............. 711/162

* cited by examiner

*Primary Examiner* — Paul Kim
(74) *Attorney, Agent, or Firm* — Campbell Stephenson LLP

(57) ABSTRACT

Various systems and methods can select an incremental modification detection technique to apply to a data object during generation of an incremental backup. For example, a method can involve accessing information indicating an access characteristic of a data object and then selecting an incremental modification detection technique (from a set of more than one different incremental modification detection techniques), in response to the information. The incremental modification detection technique is selected to be applied to the data object when generating an incremental backup. The set of incremental modification detection techniques can include change tracking and content differencing techniques.

17 Claims, 4 Drawing Sheets

SELECTION OF ONE OF SEVERAL AVAILABLE INCREMENTAL MODIFICATION DETECTION TECHNIQUES FOR USE IN INCREMENTAL BACKUPS

FIELD OF THE INVENTION

This invention relates to backups and, more particularly, to incremental backups.

DESCRIPTION OF THE RELATED ART

Organizations and individuals commonly rely on backup technology to generate backups of valuable data. If the valuable data is damaged or destroyed (e.g., due to user error, malicious interference, or hardware failure), the lost data can be retrieved from a backup. Unfortunately, many backup techniques are inefficient and can have an undesirable effect on the performance of a client's system while backups are being generated. Furthermore, many backup techniques may perform poorly when operating on certain types of data. Accordingly, improved backup techniques are desirable.

SUMMARY OF THE INVENTION

Various systems and methods for selecting an incremental modification detection technique to apply to a data object during generation of an incremental backup are disclosed. For example, a method can involve accessing information indicating an access characteristic of a data object and then selecting an incremental modification detection technique (from a set of more than one different incremental modification detection techniques), in response to the information. The incremental modification detection technique is selected to be applied to the data object when generating an incremental backup. The set of incremental modification detection techniques can include change tracking and content differencing techniques. The method may also involve generating the incremental backup by applying the selected incremental modification detection technique to the data object.

In some embodiments, the information indicating the access characteristic identifies a file type or file size of the data object. In other embodiments, the information is generating dynamically by monitoring a pattern of accesses to the data object. The information can indicate whether the data object is accessed in a sequential pattern or a random access pattern.

The method can then access second information indicating an access characteristic of a second data object and, in response to the second information, select a second incremental modification detection technique from the set of different incremental modification detection techniques. Like the incremental modification detection technique selected for the first data object, the second incremental modification detection technique is selected to be applied to the second data object when generating the incremental backup. Thus, different techniques can be selected for different objects included in the same backup.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
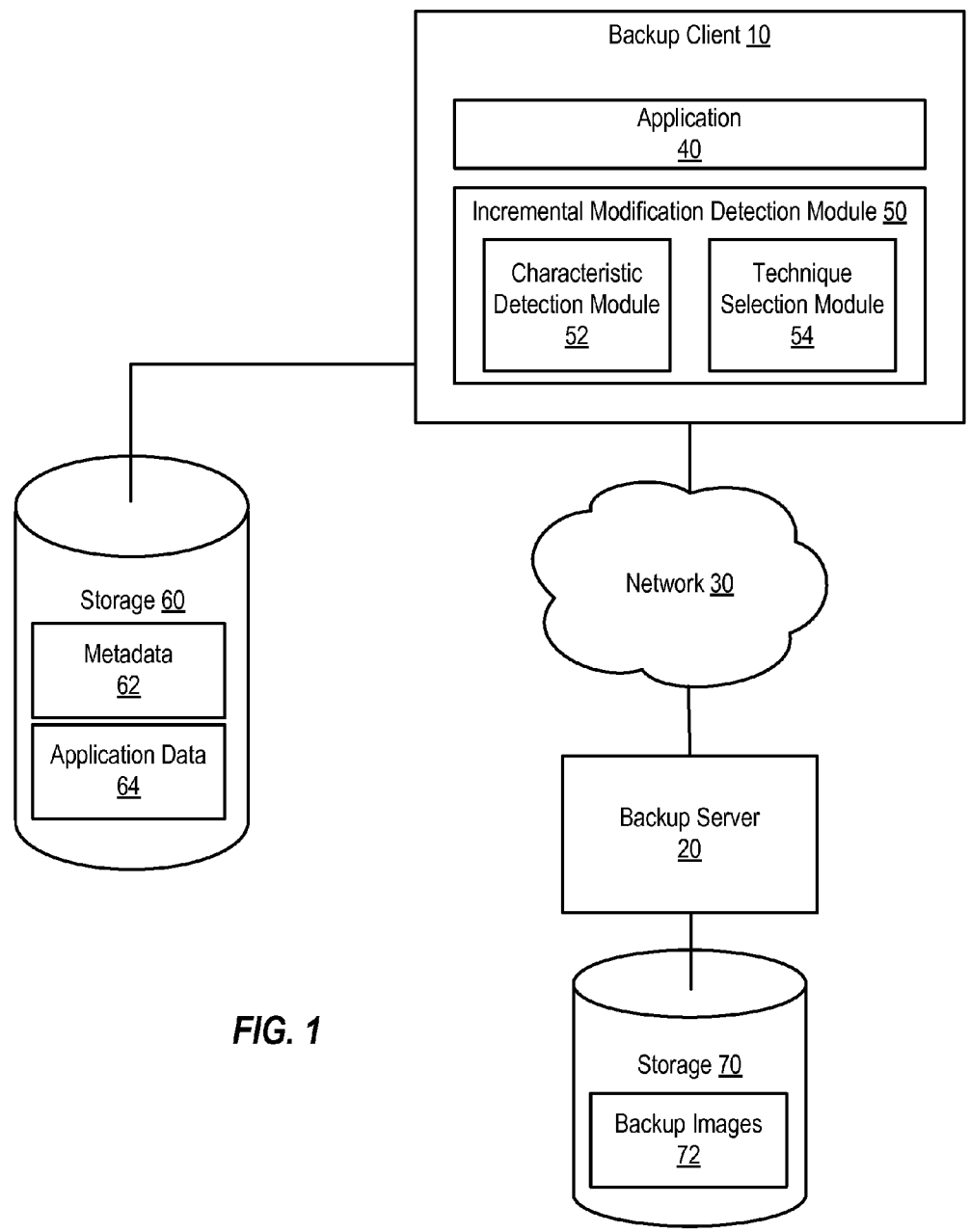
FIG. 1 is a block diagram of a backup system that can select one of several incremental modification techniques to apply to a given data object, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A backup client selects one of several available incremental modification detection techniques to use on a particular data object when performing incremental backups. The incremental modification detection technique can be selected based on static and/or dynamic characteristics of the data object. Different techniques can be selected for different data objects included in the same backup job. In many situations, such data-object-level technique selection can increase the efficiency of incremental backup jobs.

FIG. 1 is a block diagram of a computing system. As shown, the computing system includes a backup client 10 and a backup server 20, coupled by a network 30. Network 30 can include a WAN (Wide Area Network), such as the Internet, one or more LANs (Local Area Networks), and/or one or more SANs (Storage Area Networks).

Client 10 is a computing device such as a personal computer, laptop computer, server, personal digital assistant, cell phone, or the like. Storage device 60 can be included within and/or coupled to (e.g., via a bus, network, or other appropriate interconnect) client 10.

Backup client 10 implements an application 40 (e.g., a word processing program, email program, graphic editing program, database application, or the like), which accesses (e.g., by generating and/or consuming) application data 64 on storage device 60. The application data can include one more data objects (e.g., files, database components, and the like).

These data objects can be of different types (e.g., some files can be present in the same set of data as some database components).

Backup client 10 operates in conjunction with backup server 20, which is another computing device, to create one or more backup images (also referred to simply as backups) of application data 64 and to store the resulting backup image(s) 72 on a backup storage device 70. Two types of backup images can be created: full backup images and incremental backup images. Full backup images include a point-in-time copy of all data objects included within the set of data (e.g., application data 64) being backed up. In contrast, incremental backup images only include point-in-time copies of the data that has been modified since a prior backup. Preferably, the modifications are tracked at a sub-data-object level in order to reduce the amount of space needed to store the incremental backup. Otherwise, if modifications were tracked at the object level a relatively small change to a large data object would require that the entire data object be copied to the incremental backup, even though only a small portion of the data object was actually modified.

Storage devices 60 and 70 provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape).

Backup client 10 also implements an incremental modification detection module 60. Incremental modification detection module 60 is configured to detect one or more characteristics of a data object included in application data 64 and, based on the detected characteristic(s), select an appropriate incremental modification detection technique to apply to that data object when an incremental backup that includes that data object is created. Incremental modification detection module 60 stores information identifying the technique selected for each data object in metadata 62. When an incremental backup is later being performed, the backup system can obtain this metadata from incremental modification detection module 60 and use that metadata to determine what technique to use for each data object covered by the incremental backup.

Incremental modification detection module 60 can be part of a backup client. Alternatively, incremental modification detection module 60 can be implemented as part of a volume manager or file system. In one embodiment, incremental modification detection module 60 is implemented as a filter driver that provides an interface (e.g., an application programming interface) to a backup application. The backup application can obtain information identifying the selected incremental modification detection technique to use for each data object included in an incremental backup via this interface. Additionally, as is described in more detail below, the incremental modification detection module 60 can also provide certain incremental modification detection techniques.

A variety of different techniques can be used to detect incremental modifications to data objects. One example of such a technique is change tracking. Change tracking is performed by detecting each write (or other type of access that modifies data) to a data object and tracking the portions of the data object modified by each detected write. For example, assume a file includes portions A, B, C, and D, and that two writes are performed to that file during a particular period of time. The first write modifies portion A, and the second write modifies portion B. Change tracking detects these writes and that portions A and B have been modified during that particular period.

Change tracking can be performed at the application level (e.g., by monitoring or otherwise interacting with a file system) in order to detect changes to portions of data objects, as modified directly by applications. In some embodiments, incremental modification detection module 60 can perform application level change tracking by monitoring application and/or file system access to a set of data objects and recording the results. A backup system can query such a change tracker for a list of the portions of data objects that have been modified during a particular time period (e.g., the time period between the creation of a prior backup and the creation of an incremental backup).

Alternatively, change tracking can be performed at a device level (e.g., at a storage volume level). For example, many volume managers provide a bitmap that indicates which blocks within a given volume have been modified during a particular time period. A backup system can access such a data structure to identify which blocks within the data objects have been modified within a given period of time.

Another incremental modification detection technique is content differencing. Content differencing compares two versions (each a point-in-time copy, but created at different times) of a data object in order to identify the portion(s) of the data object that have been modified between the times at which the two versions were created. At its most basic, content differencing can be performed by directly comparing the data in the two versions. More sophisticated techniques can calculate signatures of each version (e.g., by applying one or more hashing algorithms to each version), and then comparing those signatures. The outcome of the comparison can identify which portions, if any, of the two versions differ from each other.

Different incremental modification detection techniques perform better with different types of data objects. For example, some data objects have a stream-based structure and are typically accessed sequentially. Incremental changes to data objects that tend to be accessed sequentially are more efficiently identified using content differencing than using change tracking. For example, word processing applications typically access files in a sequential manner. In other words, even if only a small portion of the file is actually being modified, a word processing application will typically overwrite a large portion, if not all of, the file. A change tracking application will thus identify that all of the portions of the file have been modified, even though only a small portion of the content may have actually changed. In contrast, content differencing will detect which portions have changed and which have not.

As another example, some data objects have page-based or record-based internal structures and tend to be accessed randomly. Incremental changes to data objects that tend to be accessed randomly are more efficiently identified using change tracking. For example, an email application will typically store many emails within a single data object (e.g., a personal folder (PST) file). When modifying one email, the email application will simply access the portion of the data object that contains the email, instead of rewriting the entire data object. Accordingly, change tracking can easily identify the modified portions of the data object. In contrast, content differencing typically has a fairly high overhead due to the calculations involved, and this overhead may increase with the size of the file. Accordingly, it would likely be quite inefficient to attempt to detect modification to such a data object using content differencing.

Incremental modification detection module 60 is configured to use a data object's static and/or dynamic characteristics to select an incremental modification detection technique to apply to that data object. For example, looking at FIG. 2, which shows a method that can be performed by an incremental modification detection module, if the incremental modification detection module detects that a data object tends to be sequentially accessed, the incremental modification detection module can select content differencing for the data object, as shown at 200 and 210. If instead the incremental modification detection module detects that the data object tends to be accessed randomly, the incremental modification detection module can select change tracking for the data object, as indicated at 200 and 220.

Operation 200 can be performed in a variety of different ways. In some embodiments, an incremental modification detection module detects the file type (or type of database component) of the data object. For example, the module can detect that the data object is a word processing file. Based upon the detected file type, the module can infer (e.g., using a prespecified table that identifies each file type) the type of access that tends to be performed to that data object, as well as the type of incremental modification detection that is likely to be appropriate for that data object. The file type can be determined by accessing file system metadata such as a file name, file owner, or last modifier associated with the file.

In other embodiments, an incremental modification detection module can perform operation 200 based upon the size of the data object (e.g., alone or in combination with the file type as discussed above). For example, if a data object is larger than a prespecified threshold, the incremental modification detection module can select change tracking for that data object, since the file's extreme size would likely reduce the efficiency of content differencing.

In still other embodiments, the incremental modification detection module can perform operation 200 by dynamically monitoring one or more sets of accesses to the data object. For example, if the incremental modification detection module also performs change tracking, the incremental modification detection module will detect and record each access to the data object. In one embodiment, if the incremental modification detection module detects that more than N (a prespecified positive integer) consecutive portions of the data object have been accessed sequentially (and that the data object is not a new data object in the process of being created), the incremental modification detection module can determine that the data object is sequentially accessed.

In some embodiments, the incremental modification detection module can make the determination for a particular data object in response to detecting that more than a threshold percentage of the data object has been modified. Thus, once that threshold has been exceeded, the incremental modification detection module can review the access pattern to see if it was more sequential or more random.

Figure 2:
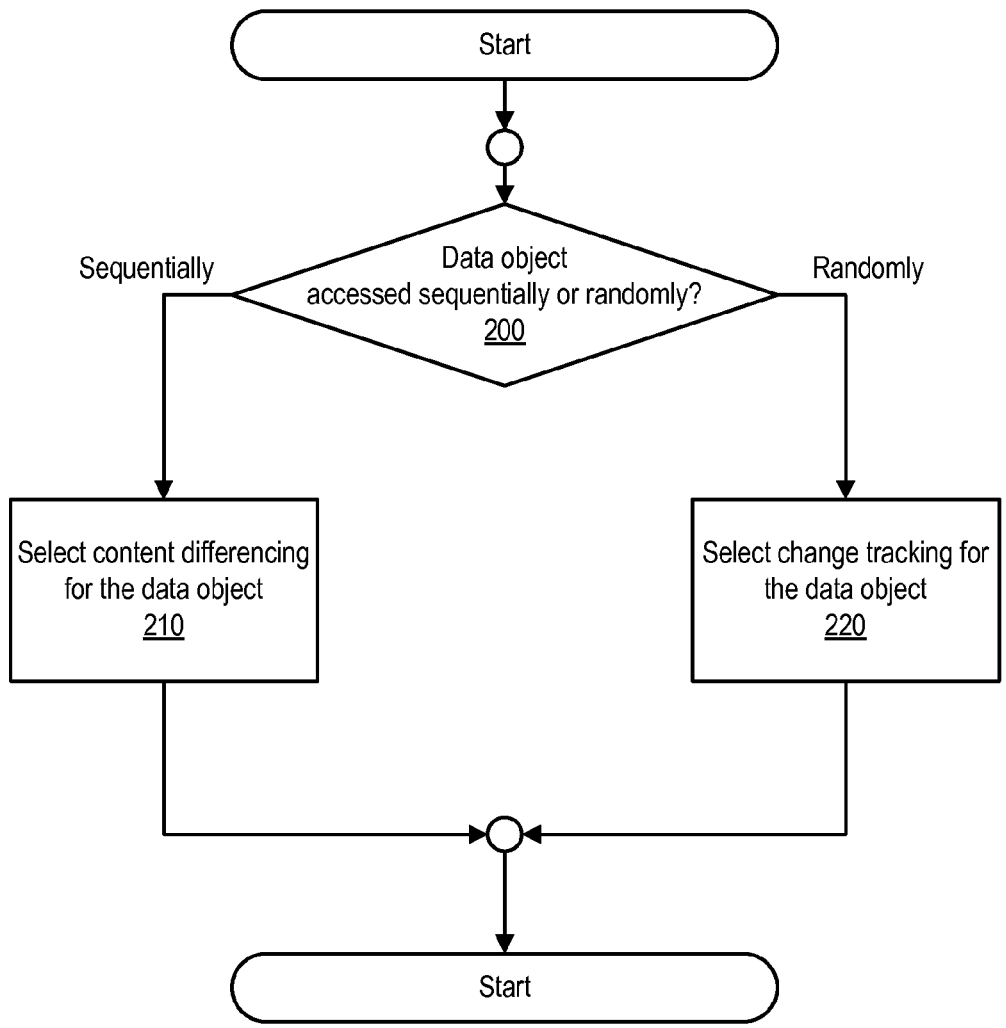
FIG. 2 is a flowchart of a method of selecting one of several incremental modification techniques to apply to a given data object, according to one embodiment of the present invention.

In some embodiments, the operations of FIG. 2 may be performed continually for all data objects, such that each data object is evaluated independently of other data objects and repeatedly over time. In other embodiments, the operations of FIG. 2 are performed at least once for each data object, but may not be repeated continually. In still other embodiments, the operations of FIG. 2 are performed at least once for each type of data object, but not necessarily for each individual data object. In these embodiments, the results obtained from a sample of a given type of data object are then applied to the other data objects of that same type. As an example, two of thirty (30) word processing files could be monitored, and the results could then be applied to the other 28 word processing files.

Returning to FIG. 1, the selections made by incremental modification detection module 60 can vary among different data objects within the same set of data. Thus, one technique may be selected for one data object within the set while a different technique is selected for another data object. Accordingly, the creation of a single incremental backup can involve the application of several different incremental modification detection techniques. As an example, within a given incremental backup that covers a set of data that includes a word processing file and an email file, the word processing file may be processed using content differencing, while the email file may be processed using change tracking.

In addition to selecting the technique to use to detect incremental modifications to a data object, incremental modification detection module 60 can also determine whether the overhead of certain techniques should be incurred for certain data objects. For example, if the incremental modification detection module 60 detects that a file is being sequentially accessed, the incremental modification detection module 60 can disable change tracking for that file. This can reduce the amount of storage space required to store the change tracking information, as well as the computing overhead required to generate additional change tracking information for the data object. If the incremental modification detection module 60 decides to disable change tracking for a particular data object, the incremental modification detection module 60 may also discard any change tracking information already gathered for that data object. Similarly, if a data object is detected to be deleted, the incremental modification detection module 60 can decide to cease change tracking and/or delete already obtained change tracking information for the now-deleted data object.

Figure 3:
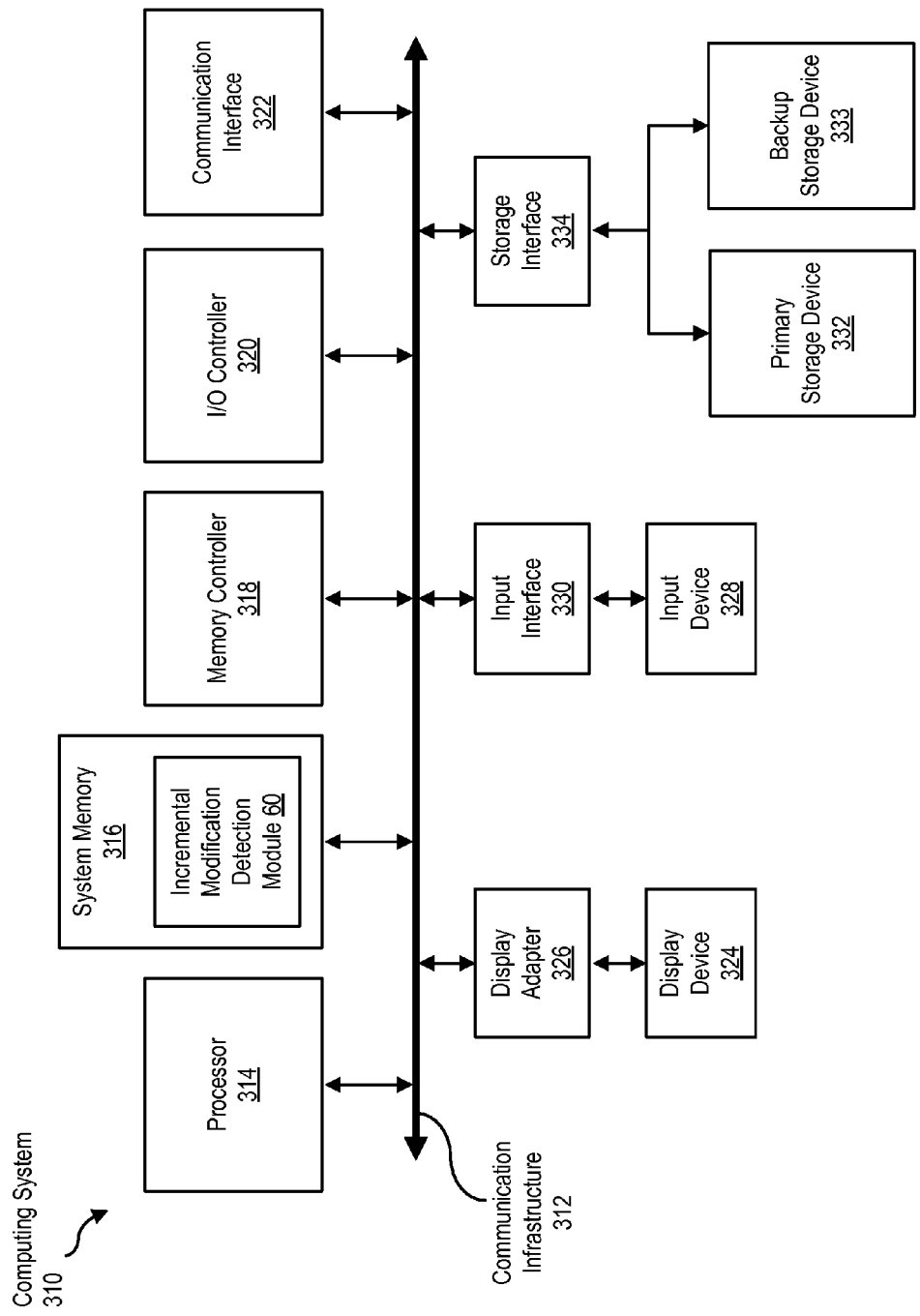
FIG. 3 is a block diagram of a computing device, illustrating how a backup module that selects one of several available incremental modification detection techniques can be implemented in software, according to one embodiment of the present invention.

FIG. 3 is a block diagram of a computing system 310 capable of implementing a backup system as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements an incremental modification detection module, computing system 310 becomes a special purpose computing device that is configured to perform backup operations, including selecting an incremental modification detection technique to apply to a data object for use in generating an incremental backup of the data object.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. Although not required, in certain embodiments computing system 310 may include both a volatile memory unit (such as, for example, system memory 316) and a non-volatile storage device (such as, for example, primary storage device 332, as described in detail below). In one example, program instructions executable to implement an incremental modification detection module 50 (e.g., as shown in FIG. 1) may be loaded into system memory 316.

In certain embodiments, computing system 310 may also include one or more components or elements in addition to processor 314 and system memory 316. For example, as illustrated in FIG. 3, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 3, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 3, computing system 310 may also include a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may be a magnetic disk drive (e.g., a so-called hard drive), a floppy disk drive, a magnetic tape drive, an optical disk drive, a flash drive, or the like. Storage interface 334 generally represents any type or form of interface or device for transferring data between storage devices 332 and 333 and other components of computing system 310. A storage device like primary storage device 332 can store information such as backup images and/or a backup catalog.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also include other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

Many other devices or subsystems may be connected to computing system 310. Conversely, all of the components and devices illustrated in FIG. 3 need not be present to practice the embodiments described and/or illustrated herein. The devices and subsystems referenced above may also be interconnected in different ways from that shown in FIG. 3.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 4:
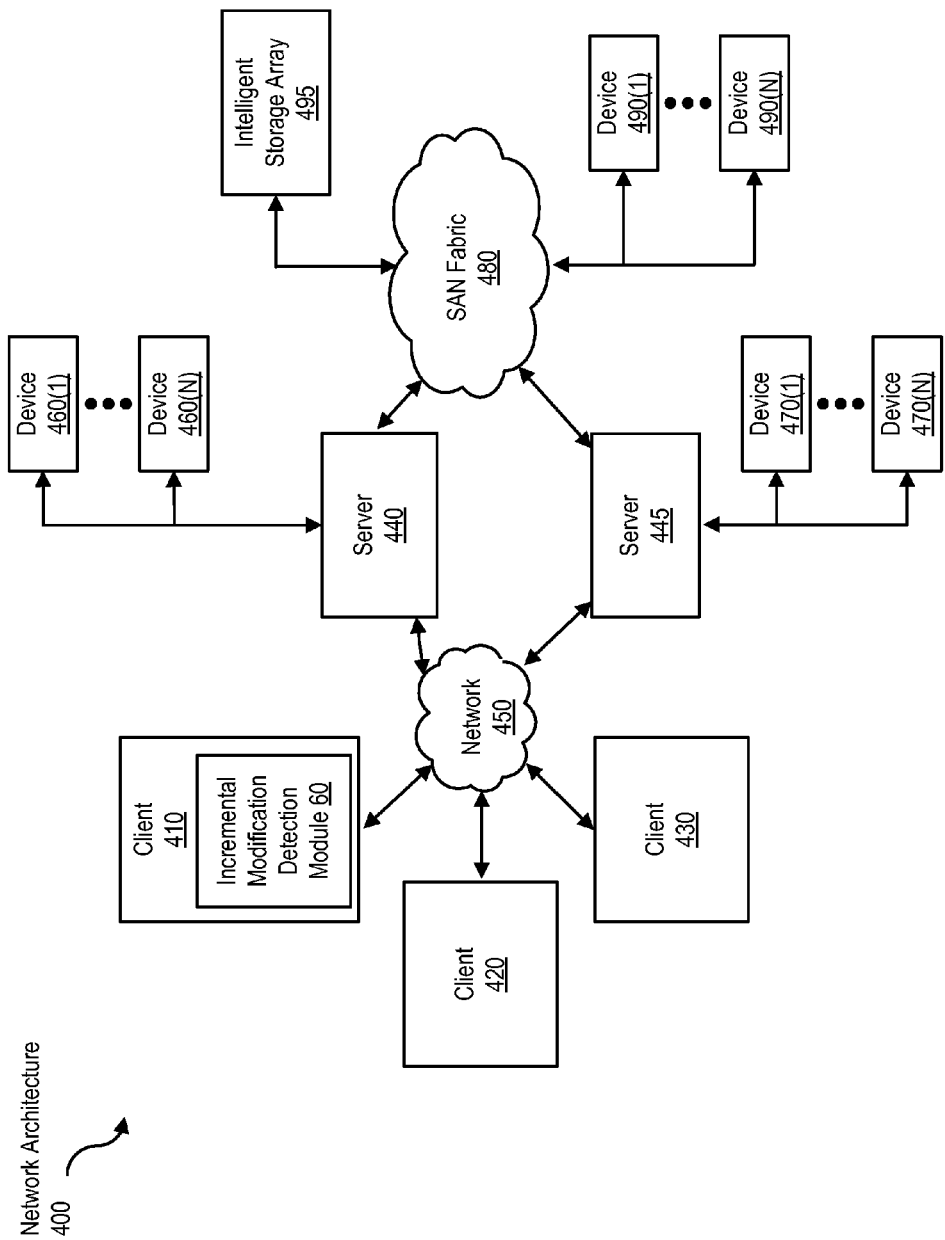
FIG. 4 is a block diagram of a networked system, illustrating how various computing devices can communicate via a network, according to one embodiment of the present invention.

FIG. 4 is a block diagram of a network architecture 400 in which client systems 410, 420, and 430 and servers 440 and 445 may be coupled to a network 450. Client systems 410, 420, and 430 generally represent any type or form of computing device or system, such as computing system 310 in FIG. 3.

Similarly, servers 440 and 445 generally represent computing devices or systems, such as application servers or database servers, configured to provide various database services and/or run certain software applications. Network 450 generally represents any telecommunication or computer network including, for example, an intranet, a wide area network (WAN), a local area network (LAN), a personal area network (PAN), or the Internet. In one example, one or more of client systems 410, 420, and/or 430 may include an incremental modification detection module 50 as shown in FIG. 1.

As illustrated in FIG. 4, one or more storage devices 440(1)-(N) may be directly attached to server 440. Similarly, one or more storage devices 470(1)-(N) may be directly attached to server 445. Storage devices 440(1)-(N) and storage devices 470(1)-(N) generally represent any type or form of storage device or medium capable of storing data and/or other computer-readable instructions. In certain embodiments, storage devices 440(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS). Such storage devices can store backup images and/or backup catalogs, as described above.

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 440(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 3, a communication interface, such as communication interface 322 in FIG. 4, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 440(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 440(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of one of the systems in FIGS. 1, 3, and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an incremental modification detection module may transform the behavior of a backup system such that the backup system selects to apply different incremental modification detection techniques to different data objects when generating incremental backups.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
accessing first information associated with a first data object within a set of data objects, wherein the first information indicates that the first data object is accessed randomly;
storing first metadata identifying that change tracking is to be used when generating an incremental backup of the first data object, in response to the first information;
accessing second information associated with a second data object within the set of data objects, wherein the second information indicates that the second object is accessed sequentially; and
storing second metadata identifying that content differencing is to be used when generating an incremental backup of the second data object, in response to the second information, wherein the accessing and the storing are performed by a processor in a computing device implementing a backup module configured to access the first and second metadata when generating an incremental backup of the set of data objects.

2. The method of claim 1, wherein the accessing the first information comprises accessing a file type.

3. The method of claim 1, further comprising generating the first information in response to monitoring a pattern of accesses to the first data object.

4. The method of claim 1, further comprising generating the incremental backup of the set of data objects, wherein the generating comprises applying change tracking to the first data object and applying content differencing to the second data object.

5. The method of claim 1, wherein the accessing the first information comprises accessing a file size.

6. A computer readable storage medium storing program instructions executable to:
access first information associated with a first data object within a set of data objects, wherein the first information indicates that the first data object is accessed randomly;
store first metadata identifying that change tracking is to be used when generating an incremental backup of the first data object, in response to the first information;
access second information associated with a second data object within the set of data objects, wherein the second information indicates that the second object is accessed sequentially; and
store second metadata identifying that content differencing is to be used when generating an incremental backup of the second data object, in response to the second information, wherein the first and second metadata cause change tracking to be applied to the first data object and content differencing to be applied to the second data object when an incremental backup of the set of data objects is generated.

7. The computer readable storage medium of claim 6, wherein the first information indicates a file type.

8. The computer readable storage medium of claim 6, wherein the program instructions are further executable to generate the first information in response to monitoring a pattern of accesses to the first data object.

9. The computer readable storage medium of claim 6, wherein the program instructions are further executable to generate the incremental backup, wherein generation of the incremental backup comprises applying change tracking to the first data object and applying content differencing to the second data object.

10. The computer readable storage medium of claim 6, wherein the first information indicates a file size.

11. A system comprising:
one or more processors; and
a memory coupled to the one or more processors, wherein the memory stores program instructions executable by the one or more processors to:
access first information associated with a first data object within a set of data objects, wherein the first information indicates that the first data object is accessed randomly;
store first metadata identifying that change tracking is to be used when generating an incremental backup of the first data object, in response to the first information;
access second information associated with a second data object within the set of data objects, wherein the second information indicates that the second object is accessed sequentially; and
store second metadata identifying that content differencing is to be used when generating an incremental backup of the second data object, in response to the second information, wherein the first and second metadata cause change tracking to be applied to the first data object and content differencing to be applied to the second data object when an incremental backup of the set of data objects is generated.

12. The system of claim 11, wherein the program instructions are further executable to generate the first information in response to monitoring a pattern of accesses to the first data object.

13. The system of claim 11, wherein the program instructions are further executable to generate the incremental backup, wherein generation of the incremental backup comprises applying change tracking to the first data object and applying content differencing to the second data object.

14. The system of claim 11, wherein the first information indicates a file type.

15. The method of claim 1, further comprising disabling change tracking for the second data object, in response to the second metadata.

16. The computer readable storage medium of claim 6, wherein the program instructions are further executable to disable change tracking for the second data object, in response to the second metadata.

17. The system of claim 11, wherein the program instructions are further executable to disable change tracking for the second data object, in response to the second metadata.

* * * * *